United States Patent [19]
Shimp et al.

[11] 4,104,691
[45] Aug. 1, 1978

[54] CIRCUIT BREAKER APPARATUS INCLUDING ASYMMETRICAL FAULT DETECTOR

[75] Inventors: Alan B. Shimp, Monroeville; Thomas N. Meyer, Murrysville; Robert T. Elms, Monroeville, all of Pa.

[73] Assignee: Westinghouse Electric Corp., Pittsburgh, Pa.

[21] Appl. No.: 728,088

[22] Filed: Sep. 30, 1976

[51] Int. Cl.² .................................. H02H 3/08
[52] U.S. Cl. ........................... 361/96; 361/98; 361/110
[58] Field of Search ............... 361/94–98, 361/110, 111, 93

[56]       References Cited
        U.S. PATENT DOCUMENTS

| 3,689,801 | 9/1972 | Engel et al. | 361/96 |
| 3,818,275 | 6/1974 | Shimp | 361/94 |
| 3,956,670 | 5/1976 | Shimp et al. | 361/98 |

Primary Examiner—Patrick R. Salce
Attorney, Agent, or Firm—M. J. Moran

[57] ABSTRACT

A circuit breaker apparatus is taught which includes three time delayed modes of interruption and an instantaneous interruption. A long time delay mode is taught for interrupting overload current in the line to be protected. The latter time delay is inversely proportional to the square of the overload current. A short time delay mode is taught for providing a circuit breaker tripping operation after a predetermined fixed time delay when the current flowing in the line to be protected exceeds a predetermined amount. An asymmetrical fault detecting range of interruption is taught which overlaps the region of overload current which normally would require an instantaneous tripping of the circuit breaker as a function of the properties of the circuit breaker but which nevertheless delays interruption of the circuit breaker for a relatively short period of time to test subsequent peaks of the fault or overload current to determine if the latter current decays to a value which does not necessitate quick tripping of the circuit breaker during the delay period. The latter case is related to the occurrence of a fully offset asymmetrical transient fault condition.

12 Claims, 1 Drawing Figure

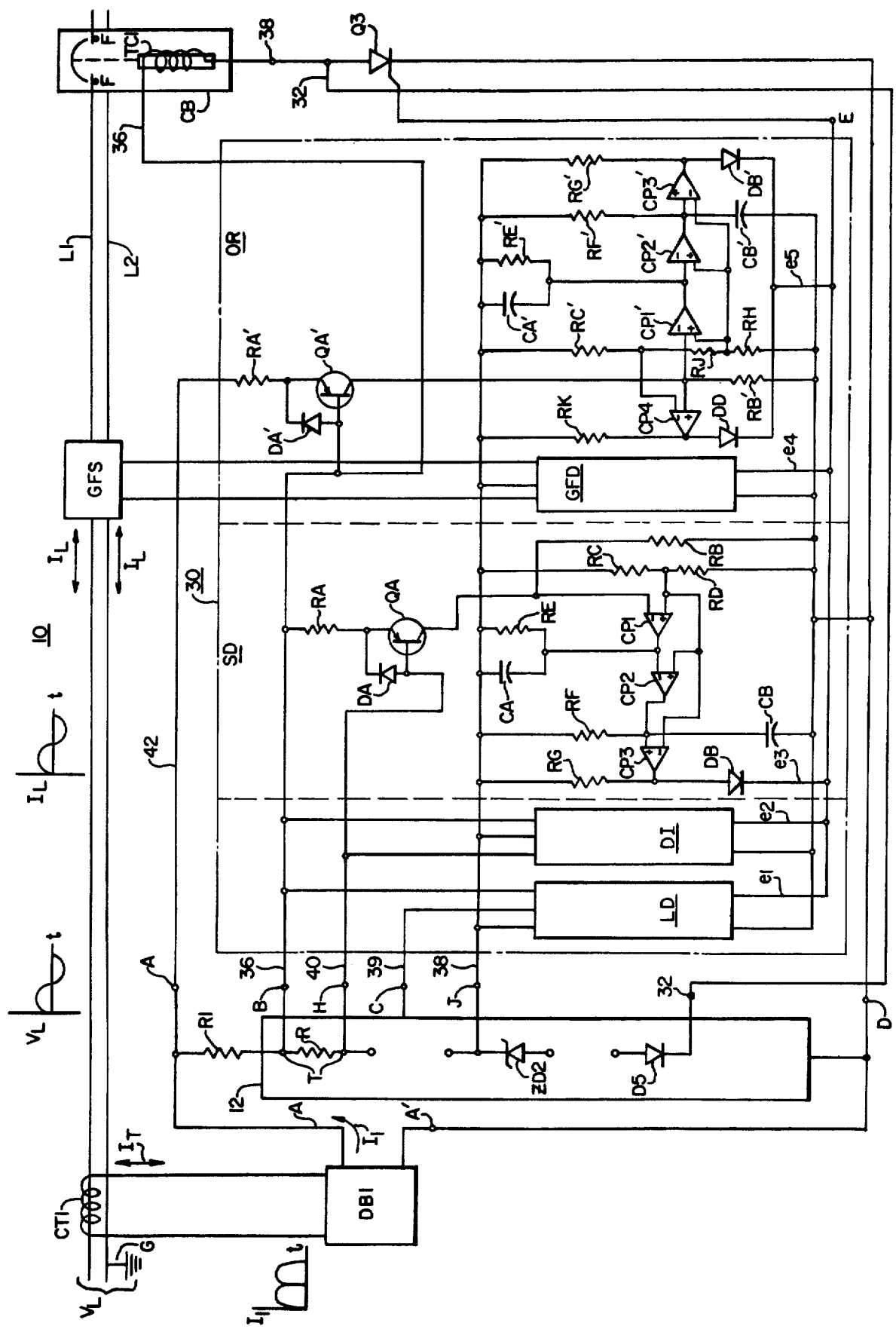

CIRCUIT BREAKER APPARATUS INCLUDING ASYMMETRICAL FAULT DETECTOR

BACKGROUND OF THE INVENTION

The subject matter of this invention is related generally to timing circuits for circuit breaker control systems and is related more particularly to those circuits which protect the circuit breaker from catastrophic failure due to an excessively high amount of fault current.

The use of various kinds of timing circuits in the control systems for circuit interrupters is well known. The various timing circuits sense predetermined levels of fault currents or overload currents and cause a timed or instantaneous opening of the circuit breaker contacts to protect the circuit which is to be protected. Apparatus of the type previously described is disclosed in U.S. Pat. No. 3,634,729, issued Jan. 11, 1972, to A. J. Hendry and J. T. Wilson and assigned to the assignee of the present invention. The prior art teaches or provides three well-known ranges of tripping. First, long delay tripping circuits are provided which actuate the tripping of the circuit breaker in inverse proportion to the square of the overload current. Second, short delay tripping circuits are taught which actuate the circuit breaker apparatus after a fixed delay when a predetermined relatively higher value of current, such as fault current, has been attained. Third, instantaneous trip circuits are provided which cause the circuit breaker apparatus to trip generally instantaneously when catastrophically high values of fault current occur in the line to be protected. Generally the timing circuits are provided to optimize the relationship between safety and convenience; that is, it is desirous to trip a circuit breaker only when it is absolutely necessary to so do and not before. Generally the instantaneous tripping characteristic of a circuit breaker is at least as much related to the physical composition of the circuit breaker apparatus as it is to the circuit to be protected. Said in another way, there are some values of fault current which are not only catastrophic in terms of the circuit to be protected, but which if allowed to continue to flow through the circuit breaker contacts, would physically destroy the circuit breaker by destroying the contacts thereof or by causing an explosion therein. The capability of an uncontrolled circuit breaker apparatus to withstand the energy of a fault is not without limit. However, even in the extreme case, the inconvenience of opening a circuit breaker and thus shutting down an entire electrical network or line is such that it is desirous to prevent the circuit breaker from tripping if the extreme fault disappears or is corrected elsewhere very quickly. Consequently, it would be advantageous if a circuit breaker protective timing circuit could be provided which on the one hand senses extreme values of current of a sufficiently high magnitude to destroy or otherwise seriously damage the circuit breaker if not interrupted very quickly, while on the other hand, introduces a slight delay in the opening of the circuit breaker contacts if the value of fault current can nevertheless be tolerated for that slight period of time to therefore check the status of the fault at a later time within the slight delay period to verify the need for tripping and abort it if possible.

SUMMARY OF THE INVENTION

In accordance with the invention, a circuit breaker apparatus with four timing ranges is taught. In addition to the long delay and short delay, this circuit breaker apparatus has a timing circuit which is interconnected with fault current sensing apparatus for generally instantaneously opening the circuit breaker contacts if the value of sensed fault current is higher than a predetermined value, which value is related to the minimum value of current which will cause a catastrophic failure in the circuit breaker if allowed to continue. The latter tripping operation is related to the peak value of the fault current in any phase at any time. This represents the prior art instantaneous trip. However, it has been found that on certain asymmetrical type faults, that is, faults with offset transients, successive peak fault values decay quickly. Faults of this type generally have high peak values initially because of the offset or asymmetrical quality of the fault current. However, these faults generally produce lower values of peak current as the fault transient decays. In the prior art the high initial peak value would have caused an instantaneous trip even though subsequent peak decay would have rendered the trip ultimately unnecessary. In the present invention any peak value of current which is below a determined minimum value for unquestionable catastrophic failure will be sensed initially when it first occurs and at some subsequent peak thereafter to determine if the current has decreased with time. If the level has decreased below a second predetermined minimum value, the previously begun time delayed opening of the circuit contacts is aborted and the circuit breaker is allowed to remain closed. If, however, the subsequently sampled peak value is higher than the second predetermined minimum value, the circuit breaker will be opened.

BRIEF DESCRIPTION OF THE DRAWINGS

For a better understanding of the invention, reference may be had to the preferred embodiments thereof shown in the accompanying drawing in which there is shown a circuit breaker control system partially in schematic form and partially in block diagram form.

DESCRIPTION OF THE PREFERRED EMBODIMENT

Referring now to the drawing, circuit interrupter apparatus 10 is shown. Circuit interrupter apparatus 10 may in a preferred embodiment of the invention comprise an improvement of the invention disclosed in U.S. Pat. No. 3,818,275, issued on June 18, 1974, to A. B. Shimp. The latter arrangement is shown duplicated with corresponding reference symbols for simplicity of illustration. An essential improvement lies in the combination of features for the timing circuit 30 utilized in cooperating disposition with other electrical and mechanical components of the circuit breaker system 10. In particular there is provided in one embodiment of the invention a single phase line L1 in which may flow an alternating electrical current $I_L$ and from which to ground G may exist a voltage $V_L$. The voltage wave shape of the voltage $V_L$ and the current wave shape of the current $I_L$ each with respect to time is shown in the FIGURE for purposes of illustration. It is to be understood, of course, that the current $I_L$ may be phase shifted from the voltage $V_L$ depending upon circuit parameters not shown in the FIGURE. In the preferred embodiment of the invention a current transformer CT1 is utilized to monitor the current $I_L$, which may flow in the line L1. The current transformer CT1 provides an alternating current $I_T$ to a diode bridge DB1. The current $I_T$ is related to the current $I_L$ and in a preferred embodiment of the invention is proportional thereto. The current $I_T$ drives the diode bridge DB1 producing an output current $I_1$. The output current $I_1$ which is depicted versus time in the FIGURE is in a preferred embodiment of the invention pulsating DC current, or said in another way, rectified alternating current. For purposes of simplicity of illustration, in the preferred embodiment, the current $I_1$ is shown flowing towards the terminal A, although it is to be understood that the direction of the current $I_1$ is relatively unimportant provided the polarties of various circuit elements, such as transistors and diodes, correspond thereto in the circuit of interest. The terminals A and A' represent the output terminals of the diode bridge DB1. Also shown is a control system 12 for the circuit interrupter system 10. The control system 12 may be similar in a preferred embodiment of the invention to the solid state or static control system 12 shown in the previously mentioned U.S. Pat. No. 3,818,275. For purposes of simplicity of illustration the control system 12 is shown essentially in block diagram form with only elements R, ZD2 and D5 shown schematically, though unconnected, for purposes of locating essential terminals. Other elements shown in the previously described U.S. Pat. No. 3,818,275 are also depicted in the present FIGURE. For example, the resistive element R1 is shown as well as the circuit breaker mechanism CB. The circuit breaker mechanism CB is shown in schematic form as having a shunt trip coil TC1 and separable main contacts F—F. The shunt trip coil is fed by the lines 36 and 38. The line 38 is interconnected with a portion of the control system 12, and is available for supplying anode current for a silicon controlled rectifier Q3. The cathode of the silicon controlled rectifier Q3 is interconnected with a terminal D, the purpose of which will be described later. The gate or control element of the silicon controlled rectifier or similar gated device Q3 is interconnected with a terminal E, the purpose of which will be described more fully hereinafter. The contacts F—F are interconnected serially with the line L1 for opening the line L1 under appropriate conditions which will be related to the status of the current $I_L$, as sensed by the current transformer CT1. The electrical arrangements represented by the blocks 12 and 30, for example, utilize the input information from the current transformer CT1 to process output signals at the terminal E to control the actuation of the trip coil TC1 in the circuit breaker CB. In this preferred embodiment of the invention, a single phase line L1 is shown, although it is to be understood that other diode bridges connected in what is commonly known as the auctioneering arrangement, that is where the outputs of the diode bridges are interconnected serially, may be utilized in conjunction with proper sensing means to provide three phase or polyphase circuit protection. It will be noted that a ground fault sensor GFS is provided in the line L1. The operation of ground fault sensor is well known. Specifically, it provides a signal which is indicative of the presence of a ground fault in the line L1.

For purposes of simplicity, the control system 12 is shown as having four lettered output terminals B, H, C, J, as well as a system common terminal D and a numbered output terminal 32. The purpose of the numbered output terminal 32 has been described in the previously mentioned U.S. Pat. No. 3,818,275 and its function will not be further described herein. It is also to be noted that a terminal A is shown. The terminal A is also shown in the previously described U.S. Pat. No. 3,818,275 as part of the output of the diode bridge DB1. In summary it may be said that the fixed terminals A, B, H, C, J and D provide input signals along lines 42, 36, 40, 39 and 38, respectively, for controlling or affecting the operation of the timing circuit 30 (no numerical designation is given to the line interconnected with the terminal D). The voltage relationship between the latter-mentioned terminals will be as follows: The voltage between the terminals J and D is a DC reference voltage. In one embodiment of the invention it may be approximately 10 volts DC. The voltage between the terminals B and C is a DC voltage which is proportional to the highest value of current IL in any phase and is determined by the value of the plug in resistor R. In this embodiment of the invention, since there is only one phase, the voltage can only be proportional to the current in that phase. The voltage between the lines B and H is a rectified AC voltage which is proportional to the highest value of current in any phase and which is also determinable by the plug-in resistor R which may be inserted between the terminals TT of the control system 12. Said in another way, this means that flexibility is provided in the system 10 for altering or changing the range of values of current at which desirable operating characteristics are to occur. The voltage between the lines A and B is similar in character to the voltage between the lines B and H inasmuch as it is a rectified voltage which is proportional to the highest value of current in a single phase. The difference between the latter two voltages lies in the fact that the voltage between the lines A and B is determined by a fixed resistor R1 which cannot be changed or varied at the discretion of the user of the apparatus. It is to protect the circuit breaker from predetermined values of overload or fault current which would be dangerous or detrimental to the operation of the circuit breaker CB. It will be noted by comparison of the present FIGURE with the apparatus shown in the previously described U.S. Pat. No. 3,818,275 that output terminals H and J are newly added for the purpose of convenience. Comparison of the interconnection of the output terminals H and J with portions of the control circuit 12 show that the elements of interest, that is, the tap-off points within the circuit 12 remain essentially the same. In the previous patent the tap-off points were not utilized for inputs to the timing circuit 30.

DESCRIPTION OF THE INTERCONNECTION OF THE ELEMENTS OF THE TIMING CIRCUIT 30

The timing circuit 30 may comprise in a preferred embodiment of the invention five timing functions which read from left to right in the FIGURE as the long delay timing circuit LD, the discriminator DI, the short delay timing circuit SD, the ground fault detector GFD, and the override OR. Each of the latter-named functional sections has an output $e1$ through $e5$ respectively, all of which are connected to the output terminal E of the timing circuit 30. The terminal E is also shown in the previously described U.S. Pat. No. 3,818,275. It essentially represents the input or control terminal for the gate of the silicon controlled rectifier Q3. The long delay LD and the discriminator DI are shown in block diagram form because their operation is known in the art. The long delay essentially provides an output signal which is inversely proportional to the square of the current $I_L$ flowing in the line L1. This follows the well-known $I^2t = K$ relationship. The long delay LD has as an input the DC voltage between the lines or terminals B and C. The next functional block is discriminator DI. It performs a very limited but an important function. In particular, the discriminator DI senses if the circuit breaker apparatus 10, including its control system is being initially installed or inserted into a line L1 which already has a significant fault situation associated therewith. The discriminator will provide an output signal at its output terminal e2 if such is the case. A short time after the apparatus 10 has been inserted into the system, the discriminator DI will automatically be excluded from operating if an initial fault condition is not present. The operation of the functional block representing the ground fault detector GFD, which is interconnected with the ground fault sensor GFS, is essentially the same as the operation of the short delay SD, which will be described in more detail hereinafter. Consequently, its description will not be duplicated for purposes of simplicity of illustration. It is to be understood, of course, that its input comes from a different source, namely the ground fault sensor GFS. GFS also utilizes line L2 in which current $I_L$ may also flow.

The short delay system SD provides the following function. If the current $I_L$ is above a certain predetermined minimum value, as determined by the plug-in resistor R, the short delay system SD will provide an output tripping signal at its output terminal e3 at a predetermined fixed increment of time after the minimum value of current $I_L$ has been initially sensed. The short delay system SD has the additional capability of aborting or cancelling the time delayed output signal should the fault condition on the line $I_L$ drop below the predetermined minimum value of current, during the short delay period. In a preferred embodiment of the invention the short delay system is timed or set up to provide an 18 cycle time delay between the sensing of the initial minimum value of fault current and the energization of the silicon controlled rectifier Q3 to actuate the circuit breaker CB to open the contacts F—F to interrupt the current $I_L$. In a preferred embodiment of the invention, abortion of the short delay circuit breaker opening operation will occur approximately one-half cycle after the current $I_L$ falls below the minimum value during the delay period. As can be clearly seen, the short delay utilizes the resistor R to provide one significant voltage reference point in its operating characteristics, which point is related to a predetermined minimum value of fault current $I_L$.

The override functional block OR operates in a similar manner to the functional block SD with a number of significant exceptions. First, the override is related to the maximum capability of the circuit breaker CB to conduct current. Consequently, the resistive element R1 is not changeable at the discretion of the user. It represents an extremely high value of fault current at which the structural and physical integrity of the circuit breaker CB is threatened. Said in another way, it represents the value at which a catastrophic failure of the circuit breaker such as by melting or welding contacts will occur. Another difference lies in the fact that two significant operating points are utilized for the override function OR, whereas only one significant point is utilized for the short delay function SD. The two important operating points or voltages for the override function OR are as follows: first, a voltage value which represents a value of current $I_L$, which is so large that the circuit breaker CB must be actuated to trip virtually instantaneously after the sensing of the current. The second value of voltage, or the second reference point, represents a value of line current which is less than the first value but which nevertheless may necessitate quick tripping, although not instantaneous tripping. Consequently, because of the presence and utilization of these two reference points, three states of operation for the override circuit OR exists. The first state is instantaneous tripping. The second state is a tripping after a very short delay period, which may be approximately two cycles, and the third state is the provision of no output signal for tripping at all. In summary then, the operation of the long delay LD, the short delay SD, and the override OR, when compared in terms of relative values of actuating current $I_L$, is as follows: The long delay circuit operates on relatively low values of overload current $I_L$ in the line L1 to be protected. It provides an output signal which is time delayed from the sensing of the overload current, where the time delay is inversely proportional to the square of the overload current. Consequently, a very low value of overload current will provide an output signal for tripping the circuit breaker CB a relatively long time after it appears on the line L1. Needless to say, that current must continue on line L1 for the entire period for circuit interruption to occur at the related time. It can also be shown that as the value of overload current on line L1 gets larger, the trip time for the circuit breaker CB gets significantly smaller until a point is reached where the short delay mode of operation takes control. In the short delay mode of operation, once a predetermined value of relatively high overload current is reached, the circuit breaker CB will trip in a relatively short time, regardless of how much higher the current goes, unless that value of current quickly decreases below the minimum value for actuating the short time delay SD. The override control system provides an output signal for extremely high values of fault current. The override will provide an output signal at some relatively short time after the predetermined extremely high value of current is sensed, provided that the predetermined value is exceeded by the peaks of the extremely high value of fault current for the entire delay period. In a preferred embodiment of the invention the latter delay period is as small as two cycles. Furthermore, the override systems will provide a nearly instantaneous trip of the circuit breaker, should the fault current be of such an extreme magnitude as to require instantaneous opening of the circuit breaker CB for the protection of the circuit breaker CB.

The construction and operation of the override circuit OR is the result of an interesting observation concerning high values of overload current. Normally, values of overload current which are sufficient to damage the circuit breaker CB can be quickly sensed and the circuit breaker CB can be quickly opened. It is known that the physical characteristics of the circuit breaker allow for a maximum value of current to flow therethrough for a specified relatively short period of time before significant damage can occur. It is also known that the peak value of current sensed during the first half cycle is related to the symmetrical value and the circuit power factor in question. If the sensed peak value therefore represents a higher value of current than the circuit breaker can tolerate for the very short fixed period, an instantaneous opening of the circuit breaker must occur. However, if it is lower than this value, but nevertheless higher than a second reference value, it has been determined that the circuit breaker can be allowed to continue to carry the amount of current even though it is of a nearly catastrophic magnitude for a very short period of time to allow the control system, specifically the status of the override relay system to recheck the current to determine if the value of current in the line L1 has diminished. If the value has not diminished below the second reference value within the relatively short time period, then the circuit breaker will catastrophically fail shortly thereafter if the circuit breaker is not opened. This of course is due to the fact that the value of current which would have flowed after that period of time would be sufficient to cause the catastrophic failure. However, if the value of current falls below the second reference value during that very short time period, it has been determined that the circuit breaker will not catastrophically fail and consequently the override will not provide the output signal to open the circuit breaker. Rather it will reset and allow the short delay SD system to control the opening of the circuit breaker. This is noted because of a phenomena associated with certain kinds of overloads. In particular, a single phase lagging power factor fault may produce an asymmetrical alternating fault current on the line L1, that is, a signal which is sinusoidally shaped but which is offset from zero. It may appear to the sensing portion of the circuit breaker control system that this highly offset peak value of asymmetrical current represents the kind of catastrophic current which should cause instantaneous or near instantaneous opening of the circuit breaker CB. However, it has been found that such a fault offset will quickly change or revert to a symmetrical state after a rather short transient period. During steady state the peak value of fault current may not be of such a magnitude as to require instantaneous opening of the circuit breaker CB. This is why the very short time delay, two cycles in the preferred embodiment, is utilized. If the offset or asymmetrical peak value is not above the first reference level which represents catastrophic failure under any conditions, the signal is checked again a short time later to see if it has decayed. If it has decayed below the second reference value, it can be determined that an opening of the circuit breaker through the override system OR is not necessitated although an opening may be later necessitated as a result of the functioning of the short delay system SD. However, if the peak value of current remains above the second reference value, even after the short time delay period, then it has been determined that the circuit breaker will have to be opened at that time.

As was mentioned previously, the long delay functional block has one input terminal thereof connected to line 39 and another input terminal thereof connected to line 36. The voltage reference is provided between line 38 and terminal D. The output is at terminal e1. The discriminator has one input terminal thereof connected to line 40 and the other input terminal thereof connected to line 36. As was the case with the long delay circuit LD, the reference is connected between lines 38 and terminal D. The output of the discriminator DI is at e2. The ground fault detector GFD has the inputs thereof connected to the ground fault sensor GFS as described previously. In addition, the reference voltage is connected between line 38 and terminal D.

The short delay SD comprises a PNP transistor QA having a diode DA connected from the base to emitter thereof in anode to cathode arrangement. Connected to the emitter of the transistor QA is a resistor RA, the other side of which is connected to the line 36. The other side of the diode DA or the base of the transistor QA is connected to line 40. The collector of the transistor QA is connected to a resistive element RB and to the negative input terminal of a comparator CP1. The positive input terminal of the comparator CP1 is connected to the voltage dividing junction of two resistive elements RC and RD, with the other side of the resistive element RC being connected to line 38 and the other side of the resistive element RD being connected to the system common terminal D. The voltage junction point is connected to the positive terminal of the comparator CP2 and to the negative terminal of a third comparator CP3. The output of the first comparator CP1 is connected to the negative input terminal of comparator CP2 and to one side each of a capacitive element CA and a resistive element RE, the other sides of which are connected to the line 38. The output of the comparator CP2 is connected concurrently to the positive input terminal of comparator CP3 to one side of a resistive element RF and to one side of a capacitive element CB. The other side of the resistive element RF is connected to the line 38 and the other side of the capacitive element CB is connected to the system common terminal D. The output of the comparator CP3 is connected concurrently to the anode of a diode DB and to one side of a resistive element RG. The other side of the resistive element RG is connected to the system common line 38. The cathode of the diode DB represents the output terminal e3 for the short delay circuit SD.

The override circuit OR comprises a PNP transistor QA′ having a diode DA′ connected from the base to emitter thereof in anode to cathode fashion. The base of the transistor QA is connected to line 36. The emitter of the transistor QA′ is connected to one side of a resistive element RA′, the other side of which is connected to system line 42. The collector of the transistor QA′ is connected concurrently to the negative input terminals of comparator CP1′, to one side of a resistive element RB′, and to the positive input terminal of a comparator CP4. There is a voltage divider network comprising resistive elements RC′, RJ and RH connected in series between the line 38 and the system common terminal D. The junction between the resistive elements RC′ and RJ is connected to the negative input terminal of the comparator CP4. The junction between the resistive element RJ and the resistive element RH is connected to the positive input terminal of the comparator CP1′, the positive input terminal of a comparator CP2′ and the negative input terminal of a comparator CP3′. The output of the comparator CP1′ is connected concurrently to the negative input terminal of the comparator CP2′ and to one side each of the capacitive element CA′ and the resistive element RE′, the other sides of which are connected to the system common line 38. The output of the comparator CP2′ is connected concurrently to the positive input terminal of the comparator element CP3′, to one side of a resistive element RF′ and to one side of a capacitive element CB′. The other side of the resistive element RF′ is connected to the system line 38 and the other side of the capacitive element CB′ is connected to the system common terminal D. Comparator element CP3′ is connected to the one side of a resistive element RG′ and to the anode of a diode element DB′.

The other side of the resistive element RG' is connected to the reference line 38 and the other side or the cathode of diode DB' is connected to the cathode of the diode DD and to the output terminal e5 for the override circuit OR. The output of the comparator CP4 is connected to the anode of the diode DD and to one side of a resistive element RK, the other side of which is connected to the system reference line 38.

OPERATION OF THE SHORT DELAY CIRCUIT SD

As was mentioned previously, the resistive element R translates the value of the current $I_L$ flowing in the line L1 into a voltage which causes the transistor element QA to provide a current to the resistive element RB which introduces a voltage at the negative input terminal of the comparator CP1. The comparator elements, such as CP1, CP2, etc., provide a zero or system common output signal when the negative input terminal thereof is at a higher voltage than the positive positive input thereof. Conversely, the output terminal of a comparator is free to assume any appropriate voltage if the voltage on the input positive terminal thereof is larger than the voltage on the negative input terminal thereof. Consequently it can be seen that as long as the voltage provided by the voltage divider RC, RD at the positive input terminal of the comparator element CP1 is larger than the voltage caused by the current flowing through resistor RB, the output of the comparator will be high or at approximately the voltage of the line 38. Therefore, by adjusting or picking the values of any of the resistive element RC, RD, RA or RB, the breakover point for changing state for the comparator CP1 can be determined, which in turn is determined by the value of $I_L$ at which it is desired to provide an output signal for tripping the circuit breaker CB. If the output of the comparator element CP1 is high, then the voltage on the negative input terminal of the comparator element CP2 is high or approximately the voltage of the line 38. The resistive values of the resistive elements RC and RD assure that in the latter condition the voltage on the negative input terminal of the comparator element CP2 is higher than the voltage on the positive input terminal thereof. Such being the case, the output of the comparator CP2 is low, which essentially shorts out or grounds the capacitive element CB, placing a lower voltage on the positive input terminal of the comparator CP3 than on the negative input terminal thereof, it being remembered that the negative input terminal has a voltage equal to the reference voltage previously described for the other comparators. Such being the case, the output of the comparator CP3 is low, and consequently, no output signal is provided at the terminal e3 for energizing the circuit breaker CB. However, once the breakover point for fault current $I_L$ is chosen, the voltage impressed across the resistive element R will produce collector current in the transistor element QA which will cause the voltage which is impressed across the resistive element RB to be larger than the voltage which is impressed across the voltage divider junction for voltage divider RC, RD, thus changing the state of the comparator element CP1 from a high state to a low state. This almost instantaneously lowers the signal on the negative input terminal of the comparator element CP2 below the reference voltage on the positive input terminal thereof, thus changing the status of the output of the comparator element CP2 from low to high. When this occurs, the capacitive element CB is free to be charged through the resistive element RF. The associated time constant is chosen to allow the capacitor CB to charge to a voltage which is higher than the reference voltage on the negative input terminal of the comparator element CP3 in an appropriate predetermined number of line cycles which will correspond to the short delay increment. If the capacitive element CB is charged to a voltage which is larger then the reference voltage on the negative input terminal of the capacitive element CP3 without being instantaneously discharged or shorted out by the output of the comparator element CP2, the output of the comparator CP3 will go high. This provides an output signal on the terminal e3 for opening the circuit breaker CB. As the voltage on the negative input terminal of the comparator element CP1 goes below that of its positive input terminal during each half cycle for the rectified voltage between the lines 36 and 40, the output of the comparator CP1 could go to a high state, but will be prevented from so doing by the relatively slow discharge of the capacitive element CA through the resistive element RE. The discharge is made to be slightly longer than about one-half of a line cycle. Consequently, if the succeeding peak of the voltage across the resistive element RB is equal to a value which corresponds to the predetermined minimum value of fault current $I_L$, the output of the comparator CP1 will go low before the capacitive element CA completely discharges, thus maintaining the relative low voltage on the negative input of the comparator element CP2 at a generally fixed value within limits relative to its positive input terminal. This allows continuous charging of the capacitive element CB through the resistive element RF. Consequently, the presence of the resistive element RE and the capacitive element CA allows storage or memory capability between half cycles of single phase fault current. If, however, the fault current disappears, the value on the negative input terminal of the comparator element CP1 will remain lower than the voltage value on the positive input terminal thereof for longer than a half cycle, and consequently an opportunity will be given for the capacitive element CA to completely discharge through the resistive element RE, thus making the voltage on the negative input of the comparator CP2 larger than the reference voltage. This provides a zero output to quickly short circuit or shunt the capacitive element CB, thus instantaneously or nearly instantaneously aborting the charging cycle operation for the capacitive element CB. This prevents a subsequent energization of the silicon controlled rectifier Q3, which in turn would open the circuit breaker contacts F—F of the circuit breaker CB. As can be seen, this is especially important on single phase faults where there is significant ripple and much more space between succeeding peaks of the rectified output current I1 of the bridge DB than there is in three phase faults. The various values of the resistive and capacitive elements can be changed to make the circuit operative for three phase faults.

OPERATION OF THE OVERRIDE CIRCUIT OR

Essentially, the operation of the override circuit is the same as the operation of the short delay circuit SD with like elements identified by primed like reference symbols. In this case, the relative value of the timing interval as determined by the resistive element RF' and the capacitive element CB' may be in the order of two line cycles, whereas the time constant for the capacitive element CA' and RE' is approximately the same as the time constant for the capacitive element CA on RE for the short delay SD. It will be noted that the input voltage divider for the comparator element CP1' comprises three resistors RC', RJ and RH rather than the two resistors RC and RB associated with the short delay SD. The first voltage reference point previously discussed with respect to the override circuit is provided at the junction between resistors RJ and RC'. This is the point or value of fault current where it is desirous to generally instantaneously trip the circuit breaker CB for catastrophically high values of fault current $I_L$. It will be noted that the current flowing through the transistor QA' is proportional to the voltage across the resistive element R1 which is fixed and is a function of the physical characteristics of the circuit breaker CB. Such not the case with respect to the short delay SD where it sill be remembered that the current flowing in the transistor element QA is proportional to a voltage across a resistive element R which is interchangeable by the user of the equipment for choosing various values of current $I_L$ at which short delay tripping is desired.

With respect to the override circuit OR, the parallel circuit arrangement comprising the resistive elements RC' and RJ, in conjunction with the voltage divider formed by the additional resistive element RH, forms the voltage reference for the comparator element CP1', etc., which is similar to the voltage reference formed by the resisitve element RC and RD with respect to the short delay circuit SD. Once the reference voltage has been established on the positive input terminals of the comparators CP1' and CP2' and on the negative input terminal of the comparator CP3', the second or lower reference voltage is established for the override circuit OR. Presuming that the current flowing through the resistive element RB' is below the second reference value, then none of the comparator elements CP1' through CP3' and CP4 will be actuated to change states to introduce an energizing signal at the anodes of either of the diodes DB' or DD. Presume, however, that the fault current reaches a value which provides a voltage across the resistive element RB' which is betweeen the voltage value at the junction terminal of the resistive elements RJ and RH and the voltage on the junction terminal of the resistive elements RJ and RC'. A timing out operation for the comparator elements CP1' through CP3' will proceed in a manner similar to that discussed with respect to the comparator elements CP1 through CP3 of the short delay circuit SD. On each succeeding peak of the half wave the memory circuit comprising the capacitive element CA' and the resistive element RE will maintain the comparator CP2' in such an output state as to allow the circuit comprising the capacitive element CB' and the resistive element RF'to time out to thus change the output status of the comparator CP3' to provide an output signal at the terminal e5. As was mentioned previously, this will take place relatively quickly. Once the timing out operation has started, each successive peak is resampled effectively by the change in voltage across the resistive element RB'. If it falls below the voltage at the junction between the resistive element RJ and RH for a time larger than one half cycle at any time during the time while CB' is charging, the timing out operation will be aborted by shorting the capacitor CB' at the output of the comparator CP2', thus preventing energization of the trip coil TC1 of the circuit breaker CB. If, however, the voltage across the resistive elemeht RB' remains high for the appropriate time-out period, a tripping operation will be initiated. Furthermore, regardless of the latter operation, if the voltage across the resistive element RB' exceeds the voltage at the junction of resistors RC' and RJ, the output of the comparator element CP4 will immediately go high, thus providing a signal through the diode DD which instantaneously trips the circuit breaker CB.

It is to be understood with respect to the embodiment of the invention that the presence of all of the five functional blocks shown in the timing circuit 30 need not always be required, depending upon the operation desired for the circuit breaker apparatus 10. It is also to be understood that the relative values of the voltages are only illustrative of a preferred embodiment and are not limiting. It is also to be understood that the various means for providing a signal to the short delay SD and the override OR, which signals are proportional to a fault current IL is not limiting. It is also to be understood that although the circuit is shown in the preferred embodiment being utilized with the apparatus described in U.S. Pat. No. 3,818,275, other signal conditioning or control equipment may be utilized providing it corresponds to the requirements described previously herein. It is also to be understood as was described previously that the various circuit parameters may be adjusted for utilization on three phase or multiphase circuit and for ground fault detection.

The apparatus taught herein has many advantages. One advantage lies in the fact that a short time delay may be actuated using digital logic comparator elements in conjunction with passive capacitive and resistive elements where a memory function is provided for utilization on single phase AC faults. It is always desirous to prevent the tripping of the circuit breaker in any active circuit, except under the conditions absolutely necessary for circuit breaker tripping. The apparatus also prevents unnecessary tripping by sensing the checking for asymmetrical offset transient fault current.

What we claim as our invention is:

1. Circuit breaker apparatus, comprising:
   a. monitoring means interconnected with an electrical conductor in which a decaying asymmetrical fault current is present, said monitoring means providing an ouput voltage signal which is generally proportional to the value of said asymmetrical fault current;
   b. peak detector means connected to receive said proportional output voltage signal from said monitoring means and provide a peak detector output voltage at the time said voltage signal from said monitoring means first exceeds a predetermined level;
   c. storing means connected to receive said peak detector output voltage at said time and store said voltage as a discrete value within limits;
   d. timed output means connected to receive said stored voltage of said storing means at said time and to produce a timed output means output signal at a time thereafter if all successive monitoring means output signal signal peaks do not occur below said predetermined level within a predetermined number of fault current cycles, said timed output means output signal not being produced if any successive signal peak from said monitoring means occurs below said predetermined level before said predetermined number of fault current cycles have expired; and e. circuit interrupting means having the separable main contacts thereof connected in circuit relationship with said conductor, said circuit interrupting means being interconnected with said timed output means to receive said timed output means output signal, said separable main contacts opening to interrupt said fault current when said output signal is produced.

2. The combination as claimed in claim 1 wherein said storing means comprises a resistive element connected in circuit relationship with a capacitive element.

3. The combination as claimed in claim 1 wherein said timed output means comprises a resistive element connected in circuit relationship with a capacitive element.

4. The combination as claimed in claim 1 comprising a second peak detector means connected to receive said proportional output voltage signal from said monitoring means and provide a second output signal at the time a signal peak first exceeds a second predetermined level which is larger in absolute value than said first predetermined level.

5. Circuit breaker apparatus, comprising:
 a. monitoring means interconnected with an electrical conductor in which a decaying asymmetrical fault current is present, said monitoring means providing an output voltage signal which is generally proportional to the value of said asymmetrical fault current;
 b. voltage comparator means connected to receive said proportional output voltage signal from said monitoring means and provide a voltage comparator output voltage at the time said voltage from said monitoring means first exceeds a predetermined level;
 c. storing means connected to receive said voltage comparator output voltage and store voltage as a discrete value within limits;
 d. timed output means connected to receive said stored voltage of said storing means at said time and to produce a timed output means output signal at a time thereafter if all successive monitoring means output signal peaks do not occur below said predetermined level within a predetermined number of fault current cycles, said timed output means output signal not being produced if any successive signal peak from said monitoring means occurs below said predetermined level before said predetermined number of fault current cycles have expired; and
 circuit interrupting means having the separable main contacts thereof connected in circuit relationship with said conductor, said circuit interrupting means being interconnected with said timed output means to receive said timed output means output signal, said separable main contacts opening to interrupt said fault current when said output signal is produced.

6. Circuit interrupter apparatus comprising:
 a. monitoring means for monitoring the amount of current in a line to be protected;
 b. circuit breaker means interconnected with said line to be protected for interrupting current flow in said line in response to a trip signal;
 c. control means interconnected with said monitoring means and said circuit breaker means for providing a trip signal to said circuit breaker means in response to the amount of said current, said control means, comprising:
 1. long delay trip means which provides said trip signal with a delay which is inversely related to the square of said current when said current is below a first predetermined level;
 2. short delay trip means which provides the trip signal with a first predetermined delay when said current is above said first predetermined level and below a second predetermined level;
 3. asymetrical current detector means which provides said trip signal with a second predetermined delay when said current is above said second predetermined level and below a third predetermined level; and
 4. instantaneous trip means which provides said signal generally instantaneously when said current is about said third predetermined level, the relationship between said second level, said third level and said second predetermined delay being as follows:
 said third level represents the peak value of current which if exceeded at any time during said second predetermined delay period will provide an RMO value of current, from the time said second predetermined delay period is started until the time said third level is exceeded by a current peak, which will cause catastrophic failure of said circuit breaker means if said trip signal is no provided generally concurrently with the time said peak exceeds said third level; and
 said second level represents the peak value of current which if not exceeded at any time during said second predetermined delay period will provide an RMS value of current, from the time said second delay begins until the time said second delay expires, which will not cause catastrophic failure of said circuit breaker means during said second delay period.

7. The combination as claimed in claim 6 wherein said asymmetrical current detector means will not provide said trip signal if said current falls below said second predetermined level during the time of said second predetermined delay.

8. The combination as claimed in claim 6 wherein said third predetermined level is related to the peak value of said current.

9. The combination as claimed in claim 6 wherein said current is alternating current when in a steady state condition and which is capable of being asymmetrically offset in a transient condition, said first asymmetrically offset current peak when in the worse state of offset but within a range defined by said second and third predetermined current levels actuating the beginning of said second predetermined delay.

10. The combination as claimed in claim 6 wherein said first predetermined level is less in absolute value than said second predetermined level which in turn is lower in absolute value than said third predetermined level.

11. The combination as claimed in claim 6 wherein said first delay period is larger than said second delay period.

12. The combination as claimed in claim 6 wherein said second delay is less than three 60 Hz cycles.

* * * * *